(12) United States Patent
Van Der Meer

(10) Patent No.: US 10,072,742 B2
(45) Date of Patent: Sep. 11, 2018

(54) CONTINUOUSLY VARIABLE TRANSMISSION WITH PULLEYS AND A DRIVE BELT

(71) Applicant: ROBERT BOSCH GMBH, Stuttgart (DE)

(72) Inventor: Cornelis Johannes Maria Van Der Meer, Tilburg (NL)

(73) Assignee: ROBERT BOSCH GMBH, Stuttgart (DE)

( * ) Notice: Subject to any disclaimer, the term of this patent is extended or adjusted under 35 U.S.C. 154(b) by 124 days.

(21) Appl. No.: 15/107,928

(22) PCT Filed: Dec. 24, 2014

(86) PCT No.: PCT/EP2014/079326
§ 371 (c)(1),
(2) Date: Jun. 24, 2016

(87) PCT Pub. No.: WO2015/097293
PCT Pub. Date: Jul. 2, 2015

(65) Prior Publication Data
US 2016/0319917 A1    Nov. 3, 2016

(30) Foreign Application Priority Data

Dec. 24, 2013  (NL) ..................... 1040573

(51) Int. Cl.
*F16H 55/56* (2006.01)
*F16H 9/18* (2006.01)
*F16G 5/16* (2006.01)

(52) U.S. Cl.
CPC .............. *F16H 9/18* (2013.01); *F16G 5/16* (2013.01); *F16H 55/56* (2013.01)

(58) Field of Classification Search
CPC ............... F16H 9/125; F16H 55/56; F16H 2061/66277; F16G 5/16; F16G 5/18
(Continued)

(56) References Cited

U.S. PATENT DOCUMENTS 2,905,005 A * 9/1959 Miner ................. F16H 61/6625
474/19
3,604,283 A * 9/1971 Van Doorne ............. F16G 1/26
474/265

(Continued)

FOREIGN PATENT DOCUMENTS

| EP | 1 158 210 A1 | 11/2001 |
|---|---|---|
| JP | 2000 213609 A | 8/2000 |
| JP | 2002 130408 A | 5/2002 |

OTHER PUBLICATIONS

International Search Report, dated Feb. 27, 2015, from corresponding PCT application.

*Primary Examiner* — Henry Y Liu
(74) *Attorney, Agent, or Firm* — Young & Thompson

(57) ABSTRACT

A continuously variable transmission includes two pulleys (1, 2), each with two pulley discs (4, 5) that are mutually oriented at a pulley angle (Φp-i; Φp-o), and a drive belt (3) with an endless carrier (31) and with a number of transverse members (32) that each arrive in contact with the pulley discs (4, 5) via contact faces thereof that are mutually oriented at a belt angle (Φb). The pulley angle (Φp-i) of one (1) of the transmission pulleys (1, 2) is set smaller than the pulley angle (Φp-o) of the other one (2) of the transmission pulleys (1, 2) and the belt angle (Φb) is set essentially equal to the larger pulley angle (Φp-o) of the other one pulley (2). This transmission is capable of transmitting a particularly high driving power with a particularly high efficiency.

5 Claims, 2 Drawing Sheets

(58) Field of Classification Search
USPC .......................................................... 474/8
See application file for complete search history.

(56) References Cited

U.S. PATENT DOCUMENTS

| | | | | |
|---|---|---|---|---|
| 4,795,406 A * | 1/1989 | Dittrich | ............... | F16G 5/18 474/201 |
| 5,328,412 A * | 7/1994 | Durum | ............... | F16H 9/125 474/242 |
| 5,792,013 A * | 8/1998 | Heinrich | ............... | F16H 9/24 474/242 |
| 6,129,643 A * | 10/2000 | Tamagawa | ............... | F16H 55/56 474/10 |
| 6,416,433 B1 * | 7/2002 | Linnenbrugger | ....... | F16H 9/125 474/242 |
| 6,656,068 B2 * | 12/2003 | Aitcin | ............... | F16H 9/125 474/12 |
| 6,926,631 B2 * | 8/2005 | Brandsma | ............... | F16G 5/16 474/17 |
| 7,037,225 B2 * | 5/2006 | Takagi | ............... | F16H 9/125 474/8 |
| 7,163,476 B2 * | 1/2007 | Yoshida | ............... | F16G 5/16 474/201 |
| 7,252,608 B2 * | 8/2007 | Reisch | ............... | F16H 9/125 474/8 |
| 7,431,674 B2 * | 10/2008 | Van Der Leest | ....... | F16H 9/125 474/148 |
| 8,491,426 B2 * | 7/2013 | Van Der Leest | ....... | F16H 9/125 474/12 |
| 8,795,110 B2 * | 8/2014 | Endler | ............... | F16H 9/125 474/8 |
| 2002/0077211 A1 * | 6/2002 | Drees | ............... | F16G 5/16 475/210 |
| 2003/0144097 A1 * | 7/2003 | Brandsma | ............... | F16G 5/16 474/8 |

* cited by examiner

CONTINUOUSLY VARIABLE TRANSMISSION WITH PULLEYS AND A DRIVE BELT

BACKGROUND OF THE INVENTION

Field of the Invention

The present disclosure relates to a continuously variable transmission provided with two pulleys and a drive belt, whereof each pulley includes a pair of conical discs that define a tapered circumferential groove and whereof the drive belt is arranged around such transmission pulleys, located, in part, in the pulley groove of the respective pulleys, while being clamped by and between the pulley discs thereof. The drive belt comprises a plurality of discrete transverse members for contacting the pulleys, as well as one or more endless, i.e. annular carriers for carrying and guiding the transverse members in the transmission. This type of drive belt is also known as a push belt.

The endless carrier of the drive belt is typically composed of a plurality of mutually nested, continuous flexible metal rings and is also known as a ring set. The endless carrier is at least partly inserted in a recess provided in the transverse members. In case the drive belt comprises only one endless carrier, such carrier is typically mounted in a central recess of the transverse members. However, usually the drive belt is provided with two endless carriers that are each mounted in a respective one of two recesses of the transverse members that open up towards a respective axial or lateral side of the drive belt.

The transverse members of the drive belt are slidingly arranged along the circumference of the endless carrier or carriers in a virtually continuous row, such that these members are able to transmit forces which are related to a movement of the drive belt. The transverse members have two main body surfaces that, at least partly, extend substantially parallel with respect to each other and that are separated from each other over the (local) thickness of the transverse member by a circumferential side surface thereof. As seen along the circumference of the carrier, the transverse members have a comparatively small dimension, i.e. thickness, such that a several hundred thereof are present in the drive belt. Adjoining transverse members must be able to tilt relative to one another, in order for the belt to follow a curved trajectory (part) in the pulley groove. To accommodate and control such relative tilting, at least one of the two main body surfaces of two adjoining transverse members in the drive belt that are mutually in contact is provided with a so-called rocking edge in the form of an axially extending, convexly rounded section of a respective main body surface.

Parts of the side surface of the transverse members, which parts are predominantly oriented in the axial direction, i.e. widthwise, are intended for frictionally engaging the pulley discs by being clamped there between. These pulley disc engaging parts of the side surface of the transverse members are denoted the contact faces and are mutually oriented at an acute—so-called—belt angle, which belt angle closely matches a—so called—pulley angle, defined by and between the pulley discs of the pulleys.

The friction contact between the contact faces of the transverse members and the pulley discs allows a force to be transmitted there between, such that the drive belt can transfer a drive torque and a rotational movement from one pulley to the other. Furthermore, because of the conical shape of the pulley discs in combination with the belt angle between the contact faces of the transverse members of the drive belt, these transverse members also experience a radially outward directed force component of the clamping force that is exerted at/by each pulley. This latter force component puts the drive belt, in particular the endless carrier(s) thereof, under tension and also enables a displacement of the respective parts of drive belt located in the pulley grooves in mutually opposite radial directions in-between a smallest and a largest radial position thereof. Hereby, the actual, respective radial positions of the drive belt at the two pulleys determine a speed ratio of the transmission.

Description of the Related Art

In the Japanese patent publication No. 2000-213609A it is observed that if the belt angle is increased relative to the pulley angle, a maximum drive torque that can be transmitted at a given clamping force favorably increases as well, at least initially. According to JP-2000-213609A, FIG. 5, such transmissible drive torque can be raised by approximately 18% at most, by applying a belt angle that is approximately 0.2 degrees larger than the pulley angle, at least relative to the drive torque that is transmissible by a transmission wherein the belt angle and the pulley angle are exactly the same.

Although such increase in transmissible torque is beneficial and highly sought after in the design of the present type transmission, is has been found to come only at the cost of a reduced overall efficiency of the transmission. In particular, it has been observed that, at least in a largest speed ratio of the transmission (which ratio is defined as a rotational speed of an output pulley of the transmission, which output pulley is associated with a load, divided by a rotational speed of an input pulley of the transmission, which input pulley is associated with an engine or motor driving the load), friction losses between the drive belt and the transmission pulleys increase as the belt angle is increased relative to the pulley angle. In practice, when the transmissible drive torque is maximized in the above-mentioned manner, i.e. by applying a belt angle that is 0.2 degrees larges than the pulley angle, a reduction of approximately 0.25% has been measured for the efficiency of the power transmission in the said largest speed ratio of the transmission. In particular in an automotive, e.g. passenger car, application of the transmission, this reduced efficiency is highly undesirable.

BRIEF SUMMARY OF THE INVENTION

The present disclosure thus aims to reduce the said efficiency loss in the largest transmission ratio of the known transmission, while maintaining the relatively high transmissible torque thereof that is provided by applying a belt angle that is larger than the pulley angle. According to the present disclosure such aim is realized in the continuously variable transmission in accordance with the claim 1 hereinafter. In the latter, novel transmission the pulley angle defined by the input pulley, i.e. the input pulley angle, is set smaller than the pulley angle defined by the output pulley, i.e. the output pulley angle, and the belt angle is set larger than the input pulley angle and, preferably, essentially equal to the output pulley angle.

In the above arrangement, the belt angle is larger than the input pulley angle to provide the said known increase in the transmissible drive torque in accordance with the know art. Furthermore, the difference between the output pulley angle and the belt angle is decreased relative to the known transmission, to counteract the observed efficiency loss in the said largest speed ratio thereof the known transmission. This novel design of the transmission in terms of the pulley and belt angles departs from and relies on the observation that, on the one hand, the friction contact between the drive belt and the input pulley in the smallest speed ratio of the transmission is the dominant factor in relation to the said transmissible torque and that, on the other hand, the friction contact between the drive belt and the output pulley in the largest speed ratio of the transmission is the dominant factor in relation to the said overall efficiency of the transmission.

It was further observed that both such dominant friction contacts respectively occur at a smallest radial position of the drive belt in the pulley groove of the respective pulley. Therefore, in a more detailed embodiment of the above, novel transmission, the pulley angle of the input pulley is set to increase in relation to the radial position of the drive belt in the pulley groove. Preferably in this latter embodiment, the input pulley angle is set essentially equal to the belt angle at least in the largest radial position thereof in the pulley groove. By this feature the efficiency of the transmission may be improved even further.

It is noted that, in practice, the belt angle of the known drive belt varies between the transverse members as a result of the inaccuracies and tolerances occurring in manufacturing. For example, in the conventional transmission a typical value of the belt angle is 22.0°, which belt angle may vary between the transverse members thereof for 0.3 of a degree, e.g. 22.0°±0.3°. Within the context of the present disclosure, a nominal belt angle is defined as the average value of the angle defines between the contact faces of the individual transverse members of the drive belt. The pulley angle can typically be set within a more narrow tolerance band of less than ±0.3° around a nominal value of the pulley angle, typically within ±0.2° or less.

BRIEF DESCRIPTION OF THE DRAWINGS

The novel transmission design according to the present disclosure will now be explained in greater detail in the following description along one or more exemplary embodiments thereof and with reference to the attached drawing figures, whereof.

Figure 1:
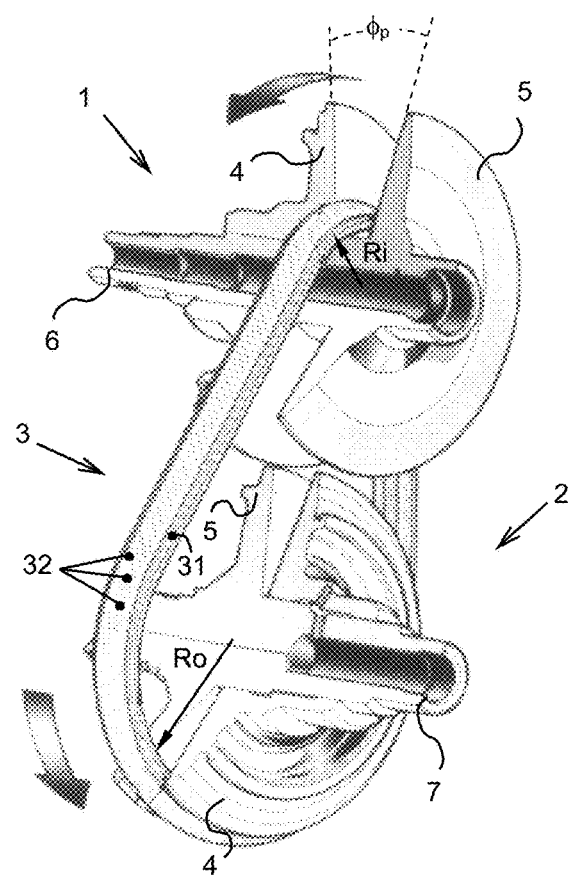
FIG. 1 provides a schematic perspective view of the continuously variable transmission with a drive belt running over two pulleys, which drive belt includes an endless carrier and a number of transverse members.

In the drawing figures equal reference signs indicate equal or similar structures and/or parts.

DETAILED DESCRIPTION OF THE PREFERRED EMBODIMENTS

The schematic illustration of a continuously variable transmission in FIG. 1 shows a drive belt 3 which runs over two pulleys 1, 2 and which includes a flexible endless carrier 31 and an essentially contiguous row of transverse members 32 that are mounted on and arranged along the circumference of the endless carrier 31. The pulleys 1, 2 each include a pair of conical discs 4, 5 that define a tapered circumferential groove that opens towards the radial outside while enclosing an acute angle; the so-called pulley angle $\phi_p$. The drive belt 3 is, in part, located in these pulley grooves, while being clamped by and between the pulley discs 4, 5 of the respective pulley 1, 2.

In the illustrated configuration of the transmission, the upper pulley 1 will rotate more quickly than the lower pulley 2. By changing the distance between the two conical discs 4, 5 of the pulleys 1, 2, the radial positions or running radii Ri, Ro of the drive belt 3 at the pulleys 1, 2 are changed in mutually opposite radial directions and, as a result, a ratio between rotational speeds of the two pulleys 1, 2, which speed ratio is linked to the ratio between the respective running radii Ri, Ro, is varied. More in particular, the speed ratio is defined as a rotational speed of an output pulley 2 of the transmission, which output pulley 2 is associated with a load, divided by a rotational speed of an input pulley 1 of the transmission, which input pulley is associated 1 with an engine or motor driving the load.

Figure 2:
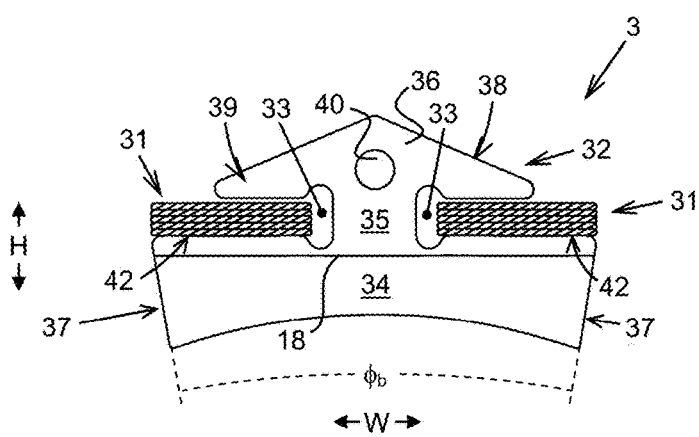
FIG. 2 shows a cross section of the known drive belt oriented in the circumference direction thereof.

In FIG. 2, the drive belt 3 is shown in a cross section thereof facing in the circumference or length direction L of the belt 3, i.e. facing in a direction perpendicular to the axial or width direction W and the radial or height direction H thereof. This FIG. 2 shows the presence of two endless carriers 31, which are shown in cross-section in this FIG. 2, that carry and guide the transverse members 32 of the drive belt 3, whereof one transverse member 32 is shown in front elevation in this FIG. 2.

The transverse members 32 and the endless carriers 31 of the drive belt 3 are typically made of steel. The transverse members 32 take-up a clamping force exerted between the discs 4, 5 of each pulley 1, 2 via contact faces 37 thereof, one such contact face 37 being provided at each axial side of the transverse member 32. These contact faces 37 are mutually diverging in radial outward direction such that an acute angle is defined there between that is denoted the belt angle $\phi_b$ of the drive belt 3.

The transverse members 32 are able to move, i.e. to slide along the endless carriers 31 in the circumference direction L, so that a torque can be transmitted between the transmission pulleys 1, 2 by the transverse members 32 pressing against one another and pushing each other forward along the endless carriers 31 in a direction of rotation of the drive belt 3 and the pulleys 1, 2. In the exemplary embodiment that is illustrated in this FIG. 2, the endless carriers 31 are composed of five individual endless bands each, which endless bands are mutually concentrically nested to form the endless carrier 31. In practice, the endless carriers 31 often comprise more than five endless bands, e.g. nine or twelve or possible even more.

Figure 3:
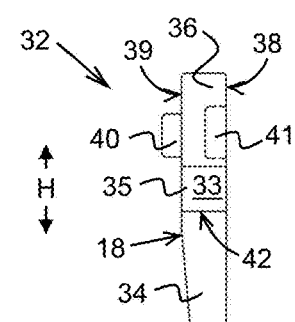
FIG. 3 provides a width-wise oriented view of a transverse member of the known drive belt.

The transverse member 32 of the drive belt 3, which is also shown in a side elevation in FIG. 3, is provided with two cut-outs 33 located opposite one another, which cut-outs 33 each open towards a respective axial side of the transverse member 32 and each accommodate a (small section) of a respective endless carriers 31. A first or base portion 34 of the transverse member 32 thus extends radially inwards from the endless carriers 31, a second or middle portion 35 of the transverse member 32 is situated in between the endless carriers 31 and a third or top portion 36 of the transverse member 32 extends radially outwards from the endless carriers 31. The radially inner side of each cut-out 33 is delimited by a so-called bearing surface 42 of the base portion 34 of the transverse member 32, which bearing surface 42 faces radially outwards, generally in the direction of the top portion 36 of the transverse member 32, and contacts the inside of an endless carrier 31.

A first or rear surface 38 of the two main body surfaces 38, 39 of transverse member 32 that face in mutually opposite circumference directions L, is essentially flat. The other or front main body surface 39 of the transverse member 32 is provided with a so-called rocking edge 18 that forms, in the radial direction H, the transition between an upper part of the front surface 39, extending essentially in parallel with its rear surface 38, and a lower part thereof that is slanted such that it extends towards the rear surface 38. In FIG. 2 the rocking edge 18 is indicated only schematically by way of a single line, however, in practice the rocking edge 18 is mostly provided in the shape of a convexly curved transition surface. The said upper part of the transverse member 32 is thus provided with an essentially constant dimension between the main body surfaces 38, 39, i.e. as seen in the circumference direction L, which dimension is typically referred to as the thickness of the transverse member 32.

Figure 4:
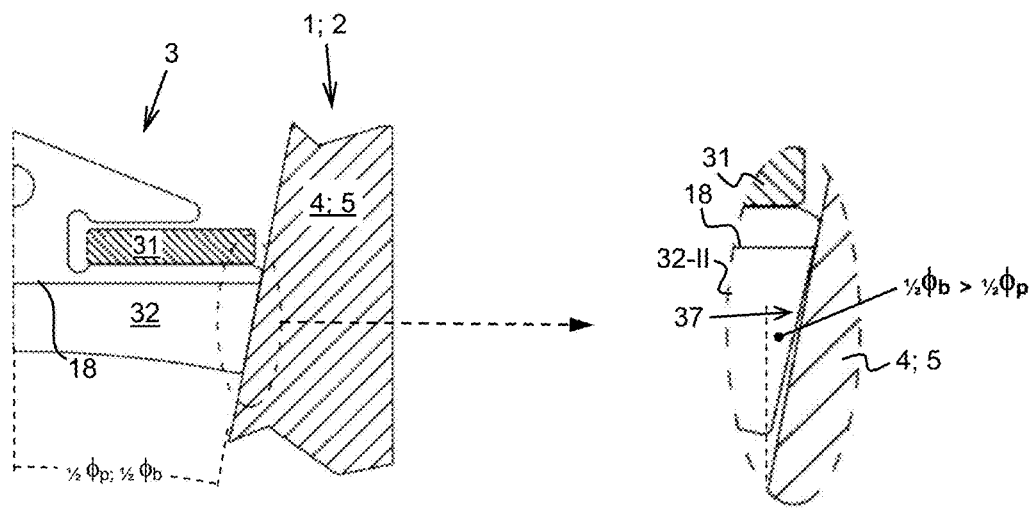
FIG. 4 provides a schematic representation of a transverse member of the drive belt that has arrived in friction contact with a pulley in accordance with the known art.

Referring back to FIG. 1, the transmission is depicted in its smallest speed ratio, wherein the drive belt 3 is located at its smallest running radius Ri at the input pulley 1 and at its largest running radius Ro at the output pulley 2, such that the rotational speed of the input pulley 1 will be higher than that of the output pulley 2. In particular in this smallest speed ratio of the transmission, the torque that is maximally transmissible by the transmission is an important characteristic in the automotive application thereof. According to JP-2000-213609A, to maximize such transmissible torque, the belt angle $\phi_b$ of the known transmission is set slightly larger than the pulley angle $\phi_p$ thereof, as is schematically illustrated in FIG. 4 in relation to the contact between one contact face 37 of the drive belt 3 and one pulley disc 4; 5 of the pulleys 1, 2.

According to JP-2000-213609A, relative to the normally applied, nominal pulley angle of 22°, the belt angle should not be set equal to such nominal pulley angle but approximately 0.2° larger, i.e. the nominal belt angle should amount to, approximately, 22.2° in order to maximize the transmissible torque. In particular, according to JP-2000-213609A the transmissible torque could thereby be increased by around 18%. According to the present disclosure, however, the exact optimum value of such difference between the nominal value of the belt angle $\phi_b$ and the nominal value of the pulley angle $\phi_p$ will depend on many factors, such as these nominal values as such and a (relative) axial stiffness of the design and shape of the transverse members 32 and the pulley discs 4, 5. For example, in a contemporary transmission design the maximum transmissible torque was realized with a belt angle $\phi_b$ of 22.6° relative to the pulley angle $\phi_p$ of 22.0°.

Figure 5:
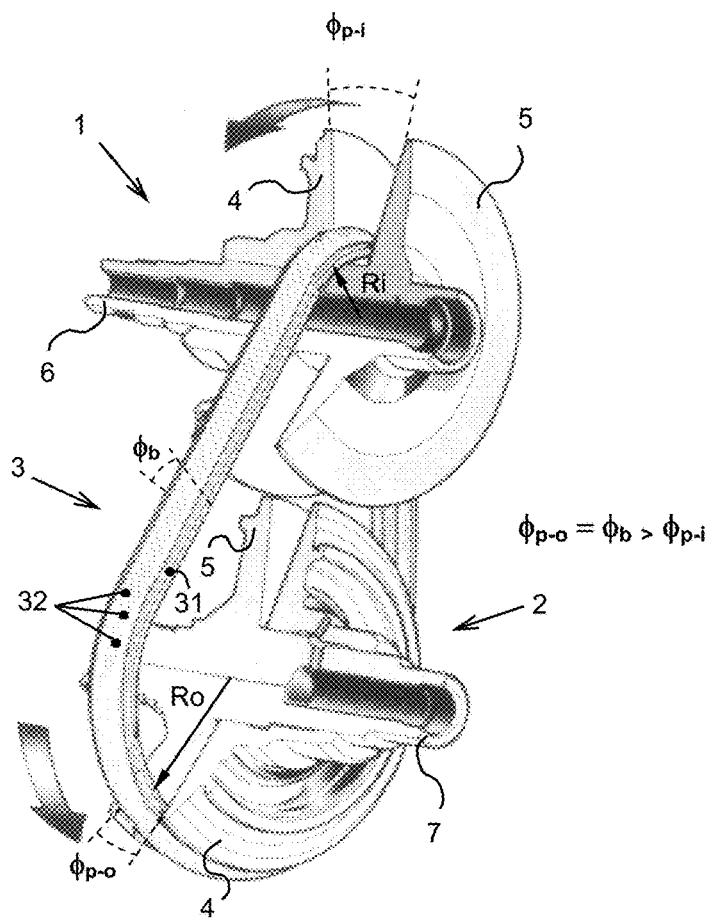
FIG. 5 provides a schematic perspective view of a novel continuously variable transmission that is designed in accordance with the present disclosure.

This known transmission comes with the disadvantage that a (friction) loss associated with the power transfer between the pulleys 1, 2 by means of the drive belt 3 during operation of the transmission was found to increase, as the difference between the belt angle $\phi_b$ and the pulley angle $\phi_p$ increases. In order to favorably reduce such power losses and/or to favorably improve the operating efficiency of the continuously variable transmission, it is presently proposed to set only the nominal pulley angle $\phi_p$ of the input pulley 1, i.e. the output pulley angle $\phi_{p-i}$, smaller than the belt angle $\phi_b$, while the nominal pulley angle $\phi_p$ of the output pulley 2, i.e. the output pulley angle $\phi_{p-o}$ is set essentially equal to the nominal belt angle $\phi_b$. This particular, novel transmission design in accordance with the present disclosure is schematically illustrated in FIG. 5. In this particular transmission design, a friction loss between the drive belt 3 and the output pulley 2 is minimized, while the advantage of the maximized transmissible torque in the largest speed ratio of the transmission that is determined by the friction contact between the drive belt 3 and the input pulley 1 is maintained.

A practical range for the difference between the input pulley angle $\phi_{p-i}$ and the output pulley angle $\phi_{p-o}$ and/or the belt angle $\phi_b$ is given by at least −0.2° up to −1.2° (wherein the minus sign means that the input pulley angle $\phi_{p-i}$ is smaller than the output pulley angle $\phi_{p-o}$ and/or the belt angle $\phi_b$). Furthermore, in this numeric example, the input pulley angle amounts to 21.4° or 0.6° less than the pulley angle of the output pulley angle and/or the drive belt angle of 22.0°.

The present disclosure, in addition to the entirety of the preceding description and all details of the accompanying figures, also concerns and includes all the features of the appended set of claims. Bracketed references in the claims do not limit the scope thereof, but are merely provided as non-binding examples of the respective features. The claimed features can be applied separately in a given product or a given process, as the case may be, but it is also possible that to apply any combination of two or more of such features therein.

The invention(s) represented by the present disclosure is (are) not limited to the embodiments and/or the examples that are explicitly mentioned herein, but also encompasses amendments, modifications and practical applications thereof, in particular those that lie within reach of the person skilled in the relevant art.

The invention claimed is:

1. Continuously variable transmission with an input pulley (1), an output pulley (2) and a drive belt (3), which input and output pulleys (1, 2) are each provided with two, predominantly conical pulley discs (4, 5) that are mutually arranged at a pulley angle ($\Phi_p$; $\Phi_{p-i}$; $\Phi_{p-o}$) and that are in contact with contact faces (37) on either side of the drive belt (3), which contact faces (37) on either side of the drive belt (3) are mutually arranged at a belt angle ($\Phi_b$), in which transmission the contact between the drive belt (3) on the one hand and the input pulley (1) or the output pulley (2) on the other hand can vary between a smallest radial position and a largest radial position relative to the pulley discs (4, 5) of the respective pulley (1, 2), wherein, the drive belt includes only a single pair of contact faces, and in which transmission at least at the smallest possible radial position of the contact, the pulley angle ($\Phi_{p-i}$) of the input pulley (1) is smaller than the pulley angle ($\Phi_{p-o}$) of the output pulley (2), wherein the belt angle ($\phi_b$) is larger than the pulley angle ($\Phi$p-i) of the input pulley (1) and is at most equal to or smaller than the pulley angle ($\Phi$p-o) of the output pulley (2) and in that the belt angle ($\Phi$b) is, at least approximately, equal to the pulley angle ($\Phi$p-o) of the output pulley (2) at the smallest possible radial position of the contact.

2. The continuously variable transmission according to claim 1, wherein, at the smallest possible radial position of the contact, the pulley angle ($\Phi_{p-i}$) of the input pulley (1) is at least 0.2 and at most 1.2 degrees smaller than the pulley angle ($\Phi_{p-o}$) of the output pulley (2).

3. The continuously variable transmission according to claim 1, wherein a nominal value of the pulley angle ($\Phi_{p-o}$) of the output pulley (2) amounts to approximately 22.0 degrees and, at the smallest possible radial position of the contact, the nominal value of the pulley angle ($\Phi_{p-i}$) of the input pulley (1) amounts to approximately 21.4 degrees.

4. The continuously variable transmission according to claim 1, wherein, at least at the largest possible radial position of the contact, the pulley angle ($\Phi_{p-i}$) of the input pulley (1) is, at least approximately, equal to the pulley angle ($\Phi_{p-o}$) of the output pulley (2).

5. The continuously variable transmission according to claim 1, wherein the drive belt (3) is provided with an endless carrier (31) and a number of transverse members (32) mounted consecutively and slidably on the endless carrier along the circumference thereof, whereof each transverse member (32) is provided with a front main body surface (39) and a rear main body surface (38), between which surfaces (38, 39) the transverse member (32) extends in thickness direction and between which surfaces (38, 39) the transverse member (32) is provided with a contact face (37) on either side thereof, destined for friction contact with the input and the output pulleys (1, 2) of the transmission, the contact faces (37) of each transverse member (32) are mutually oriented at an angle and the belt angle ($\Phi_b$), or at least the nominal value thereof, corresponds to the average value of the angle between the contact faces (37) of all of the transverse members (32) of the drive belt (3).

\* \* \* \* \*